P. M. HEYERDAHL.
PROCESS FOR THE EXTRACTION AND REFINING OF OIL.
APPLICATION FILED JULY 16, 1919.
1,368,148.
Patented Feb. 8, 1921.
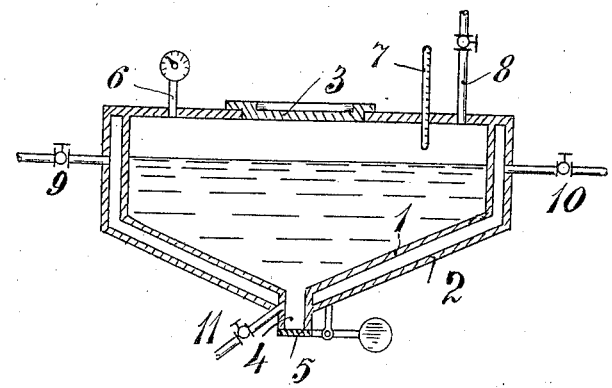
INVENTOR:
Peter Möller Heyerdahl
BY
ATTORNEY.

UNITED STATES PATENT OFFICE.

PETER MOLLER HEYERDAHL, OF SVOLVÆR, NORWAY.

PROCESS FOR THE EXTRACTION AND REFINING OF OIL.

1,368,148. Specification of Letters Patent. Patented Feb. 8, 1921.

Application filed July 16, 1919. Serial No. 311,336.

*To all whom it may concern:*

Be it known that I, PETER MÖLLER HEYERDAHL, of Svolvær, in the Kingdom of Norway, have invented certain new and useful Improvements in Processes for the Extraction and Refining of Oil; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the extraction and refining of fish oils and similar oils and has for its object a process by means of which a product of an improved flavor is obtained.

The production of fish oils is usually as follows: The oil bearing substance is heated by means of steam, which is either introduced directly into the substance or used to heat from the outside the vessel containing the substance. In the latter instance a water bath is sometimes employed instead of steam. The heated vessel is then usually provided with suitable stirrers to effect a uniform distribution of the heat.

In the year 1890 I introduced an improvement in this process consisting in excluding the air or substituting it by indifferent gases during the heating operation. It was attained by this treatment to prevent any oxidation of the oil extracted by the heating operation, such oil being as shown by chemical researches made by me to be of a very high susceptibility in this respect. By this improvement in the process a cod liver oil of considerably milder flavor than that previously produced could be obtained. The novel product was given the designation "hydroxylfree codliver oil". As a matter of fact however even the oil produced according to this improved method is not free from the peculiar nauseous taste which makes so many patients incapable of taking this valuable medicine. I have now succeeded in obviating this disadvantage by means of a special treatment, whereby the formation of the substances producing the nauseous flavor referred to during the heating of the liver or other oil bearing substance is reduced to a minimum at the same time as the small quantities produced are extracted and removed during the treatment so that the recovered oil is a tasteless and odorless preparation.

A characteristic feature of my process consists in that the oil under the extraction or refining operation is subjected to an action of a flowing inactive gaseous substance in the presence of water. The gaseous substance employed may consist of an inactive gas such as hydrogen, nitrogen, carbon dioxid or the like or of a vapor such as water vapor either alone or mixed with one or more other gases or vapors.

When water vapor alone is employed a reduced pressure should be maintained during the treatment so as to allow of carrying the treatment into effect at a low temperature (below 100° C.).

According to a preferred embodiment of the invention the vapor is produced within a charge of the oil or oil bearing material by heating the same in the presence of water to the boiling temperature of water under the prevailing reduced pressure. The extraction of oil may for instance be carried into effect in the manner that the oil-bearing substance after having been cleaned is finely ground and thereupon mixed with a suitable quantity of water in a closed vessel connected to a suction apparatus and provided with pressure gage and thermometer. The water may be fresh or salt or slightly acid or weakly alkaline depending upon the nature of the treated substance. Also other aqueous solutions may be used and besides this the quantity of liquid employed may be varied. By means of the suction apparatus the air contained in the vessel may be exhausted and at the same time the inner pressure in the vessel is reduced. The vessel is then heated on a water bath or by the external application of steam for instance to about 75° C. When the water in the vessel has reached the temperature which corresponds to its boiling temperature under the prevailing reduced pressure produced by the suction the agitation caused by the boiling will result in the water stirring and inclosing all the finely divided particles of the oilbearing material, and according as this latter gives off its fat globules these latter will become washed out by the water boiling at a low temperature, which at the same time effects the extraction of the small quantities of taste giving substances formed during the heating process and which have partly been taken up by the oil. During the continued boiling these taste giving substances, which in a concentrated condition have an intensive taste and smell are volatilized with the water vapor and carried off from the vessel through suction conduits.

By this process it is thus attained, that owing to the low pressure and low temperature employed the least possible quantity of taste giving substances is formed during the heating and that these substances are taken up by the water and volatilized with the water vapors according as they are formed by the suction and carried out of the vessel. The oxidation of the oil is at the same time completely obviated by means of the air being exhausted from the vessel.

When the melting out of the oil is completed which may require a duration of time varying with the character of the oilbearing substance, the mass is left standing until the oil is completely separated from the rest of the material. The oil and the residuum are then separately withdrawn from the vessel by suitable means.

An apparatus which could be used for carrying the described process into effect is diagrammatically illustrated in the accompanying drawing by way of example. In this example 1 is a vessel provided with a steam jacket 2. This vessel has an airtight cover 3 and discharge opening 4 with closing valve 5. The vessel is also provided with vacuum meter 6, thermometer 7, suction conduit 6, steam supply conduit 10, steam outlet 9 and condensation water outlet 11. Instead of causing the water vapor in its entirety to be evolved within the aqueous oil-bearing mass steam or steambearing inactive gas of low temperature may also be passed through the mass from outside.

When an inactive gas is employed it is not necessary to carry the process into effect under a reduced pressure it being sufficient to maintain a low temperature. In most instances a temperature of between 50 and 90° C. will be suitable.

The gas is introduced into the oil or oil-bearing mass in such a manner as to cause the mass and the water present to be strongly and thoroughly agitated and mixed the gas as well as the water being hereby brought into intimate contact with the particles of the treated mass.

I claim as my invention:

1. In the extraction and refining of cod liver oil and other fish oils the process which consists in subjecting the oil at a temperature considerably below 100° to the action of a flowing inactive gaseous fluid in the presence of liquid water in a proportion sufficient to effect washing of the oil during the treatment.

2. The process for the extraction and refining of cod liver oil and other fish oils according to claim 1 which consists in subjecting the oil at a reduced pressure and at a temperature below 100° to the action of water vapor in the presence of liquid water, the water vapor being evolved within the mass of oil bearing material.

3. Process for the extraction and refining of cod liver oil and other fish oils according to claim 1 which consists in boiling finely divided oil bearing material in the presence of a considerable quantity of liquid water under a reduced pressure and at a correspondingly low temperature and simultaneously removing by suction the taste and smell giving substances.

In testimony that I claim the foregoing as my invention, I have signed my name in presence of two subscribing witnesses.

PETER MÖLLER HEYERDAHL.

Witnesses:
 GUNVOR FENTOFT LARSSEN,
 NANCY ASLAKSIN,